United States Patent
Fronberg

(10) Patent No.: US 7,266,688 B2
(45) Date of Patent: Sep. 4, 2007

(54) METHODS FOR IMPROVED SECURITY OF SOFTWARE APPLICATIONS

(75) Inventor: Paul A. Fronberg, Redwood City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 788 days.

(21) Appl. No.: 10/342,567

(22) Filed: Jan. 14, 2003

(65) Prior Publication Data
US 2004/0139317 A1   Jul. 15, 2004

(51) Int. Cl.
*H04L 9/00* (2006.01)
*G06F 17/30* (2006.01)

(52) U.S. Cl. .............. 713/164; 713/165; 713/189; 726/16

(58) Field of Classification Search ........ 713/164–165, 713/189; 718/100; 726/16
See application file for complete search history.

(56) References Cited

U.S. PATENT DOCUMENTS

| | | | | |
|---|---|---|---|---|
| 5,530,758 A | * | 6/1996 | Marino et al. ............. | 713/150 |
| 5,584,023 A | * | 12/1996 | Hsu ........................... | 707/204 |
| 6,070,198 A | * | 5/2000 | Krause et al. .............. | 719/321 |
| 6,098,112 A | * | 8/2000 | Ishijima et al. ............ | 719/321 |
| 6,853,731 B1 | * | 2/2005 | Boyle et al. ................ | 380/268 |
| 2001/0044904 A1 | * | 11/2001 | Berg et al. ................. | 713/201 |
| 2003/0056095 A1 | * | 3/2003 | Elliott et al. ............... | 713/164 |
| 2003/0120935 A1 | * | 6/2003 | Teal et al. .................. | 713/188 |
| 2003/0126434 A1 | * | 7/2003 | Lim et al. ................... | 713/164 |
| 2004/0091114 A1 | * | 5/2004 | Carter et al. ............... | 380/259 |

* cited by examiner

*Primary Examiner*—Emmanuel L. Moise
*Assistant Examiner*—Minh Dieu Nguyen
(74) *Attorney, Agent, or Firm*—Martine Penilla & Gencarella, LLP

(57) ABSTRACT

Methods and systems thereof for providing security of information in a computer system are described. The information is received in the user space defined according to the operating system executed by the computer system. An encode system call is used to copy the information to the kernel space defined according to the operating system. The information may also be encrypted in response to the encode system call. The information can then be cleared from user space. A decode system call causes the information to be returned to user space. If the information is encrypted, the information is also decoded in response to the decode system call. As a result, the amount of time that the information is accessible outside of kernel space is reduced.

21 Claims, 3 Drawing Sheets

METHODS FOR IMPROVED SECURITY OF SOFTWARE APPLICATIONS

BACKGROUND OF THE INVENTION

1. Field of the Invention

Embodiments of the present invention relate to computer system software. More specifically, embodiments of the present invention relate to methods and systems for protecting information in a computer system.

2. Related Art

Preventing unauthorized access to sensitive information stored on networked computer systems is of paramount interest to users and network administrators. Mechanisms such as password protection and encryption provide some level of security; however, even with these mechanisms in place, sensitive information remains vulnerable.

Consider the use of passwords, for example. As part of a typical login, a query process is initiated in which the user's password is entered. In general, the password is temporarily placed in a buffer (e.g., in a login program area) until it is encrypted and then compared with a name service database (e.g., an Active Directory, a Lightweight Directory Access Protocol database, or the like) for authentication. Although the time in the buffer may be short, it is exposed to access by unauthorized persons during this time. If there are any subsequent network delays that impede encrypting of the password and/or forwarding of the password to the name service database, the window of opportunity for unauthorized access is expanded. In addition, while the use of a password may hinder external attacks on information security, attacks may also originate internally. To a savvy internal user, or to a privileged user on the system such as a network administrator of some sort (e.g., a "root user"), the password may be readily available.

A common form of attack against an encrypted password may be referred to as a "dictionary attack." The attacker uses a database of words, names, dates, etc., that constitute the "dictionary." The entries in the dictionary are encrypted and compared against the encrypted password. This type of attack is unfortunately very efficient because many people select passwords that are readily guessed. A similar form of attack can be used when the passwords are not encrypted.

Thus, while passwords provide a degree of protection in the prior art, the level of protection provided by passwords may be readily surmounted.

Other types of sensitive information, such as database entries, may also be vulnerable to unauthorized access while being manipulated by an executing program. Oftentimes, the information is not encrypted, or it may remain in the clear for a protracted period of time prior to encryption. During these times, the information may be accessible to unauthorized persons, including privileged users.

Sensitive information may also become accessible in the event of a core dump that occurs as a result of some type of failure (e.g., the computer system "locks up"). A typical operating system will create a core file (image) that captures the state of the executing program at the time of the failure, particularly when write privileges have been granted by the program. A computer-savvy individual can then gain access to the core file and to the sensitive information it might contain. Also, a privileged user on the system may purposely trigger a failure, with the intent of forcing the creation of a core file in order to access the sensitive information it might contain.

To summarize, there are many times when a program will access and manipulate sensitive information (passwords, database entries and the like). During these times, the information is vulnerable to access by unauthorized persons (including privileged users). Furthermore, program errors, malicious or otherwise, may allow the information to become accessible to unauthorized persons.

SUMMARY OF THE INVENTION

Accordingly, a method and/or system that can improve the security of information in a computer system would be beneficial. Embodiments of the present invention provide a solution to such a problem.

Embodiments of the present invention provide methods and systems thereof for providing security of information (e.g., passwords, database entries and the like) in a computer system. The information is received in the user space defined according to the operating system executed by the computer system. According to embodiments of the present invention, an encode system call is used to copy the information to the kernel space defined according to the operating system. In one such embodiment, the information is then cleared from the user space. According to other embodiments of the present invention, a decode system call causes the information in kernel space to be copied and returned to user space.

In one embodiment, the information is encrypted in response to the encode system call. In such an embodiment, the decode system call will cause the encrypted information to be copied to user space in decrypted form (that is, the information is copied to user space and decrypted, although not necessarily in that order).

In one embodiment, before the information is encrypted in kernel space, the information may already be conventionally encrypted (e.g., in user space). In that case, the information is re-encrypted (essentially, doubly encrypted) in kernel space in response to an encode system call.

According to the embodiments of the present invention, the encryption key used to encrypt in kernel space is maintained in kernel space. In various embodiments, the encryption key is unique per process, unique per user, shared by processes, shared by users, or unique per system call. In another embodiment, the encryption key is derived from attributes of a program that executes a process. In one such embodiment, the information and the encryption key are inherited by the children of the process.

Thus, the present invention, in its various embodiments, can reduce the amount of time that information is accessible outside of kernel space. This advantage, as well as other objects and advantages of the present invention, will be recognized by those of ordinary skill in the art after reading the following detailed description, which is also illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of these embodiments.

DETAILED DESCRIPTION OF THE INVENTION

Figure 1:
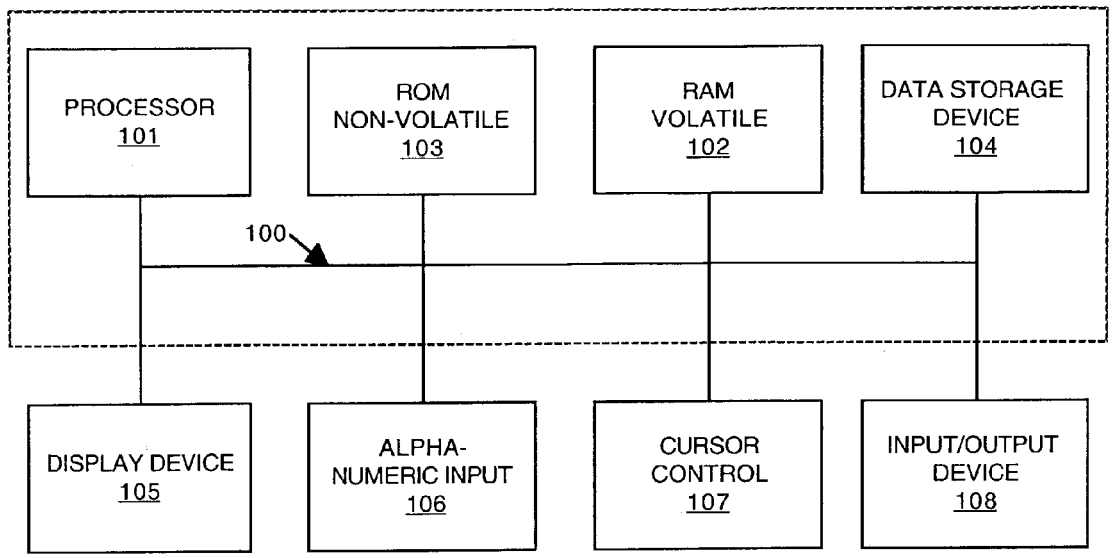
FIG. 1 is a block diagram of an exemplary computer system upon which embodiments of the present invention may be implemented.

Reference will now be made in detail to the various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," "executing," "clearing," "causing," "buffering," "encrypting," "decrypting," "copying," "generating," "removing," "storing," or the like, refer to the action and processes (e.g., flowchart 400 of FIG. 4) of a computer system or similar intelligent electronic computing device, that manipulates and transforms data represented as physical (electronic) quantities within the computer system's registers and memories into other data similarly represented as physical quantities within the computer system memories or registers or other such information storage, transmission or display devices.

Referring first to FIG. 1, a block diagram of an exemplary computer system 112 is shown. It is appreciated that computer system 112 described herein illustrates an exemplary configuration of an operational platform upon which embodiments of the present invention can be implemented. Nevertheless, other computer systems with differing configurations can also be used in place of computer system 112 within the scope of the present invention.

Computer system 112 includes an address/data bus 100 for communicating information, a central processor 101 coupled with bus 100 for processing information and instructions; a volatile memory unit 102 (e.g., random access memory [RAM], static RAM, dynamic RAM, etc.) coupled with bus 100 for storing information and instructions for central processor 101; and a non-volatile memory unit 103 (e.g., read only memory [ROM], programmable ROM, flash memory, EPROM, EEPROM, etc.) coupled with bus 100 for storing static information and instructions for processor 101. Computer system 112 may also contain an optional display device 105 coupled to bus 100 for displaying information to the computer user. Moreover, computer system 112 also includes a data storage device 104 (e.g., a magnetic, electronic or optical disk drive) for storing information and instructions.

Also included in computer system 112 is an optional alphanumeric input device 106. Device 106 can communicate information and command selections to central processor 101. Computer system 112 also includes an optional cursor control or directing device 107 coupled to bus 100 for communicating user input information and command selections to central processor 101. Computer system 112 also includes signal communication interface (input/output device) 108, which is also coupled to bus 100, and can be a serial port. Communication interface 108 may also include wireless communication mechanisms.

Figure 2:
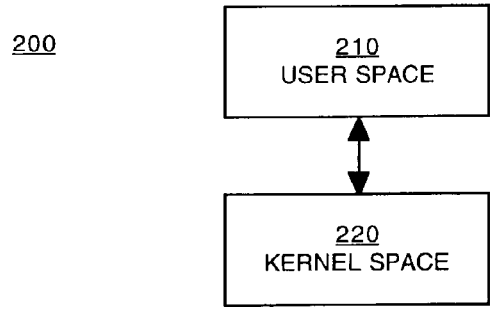
FIG. 2 is a representation of user space and kernel space according to one embodiment of the present invention.

FIG. 2 is a representation of a memory or address space 200 that is divided into "user space" (or user layer) 210 and "kernel space" (or kernel layer) 220 according to one embodiment of the present invention. In general, as is well known in the art, a computer operating system (e.g., the operating system's memory manager) will define virtual address spaces for application code and data. A portion of the virtual address space is assigned to kernel space, and another portion is assigned to user space.

Kernel space 220 generally serves as a layer between user space 210 and the hardware of the computer system, providing a common operating environment for executing the various software applications (programs) implemented on the computer. By acting as a layer "below" user space 210, kernel space 220 can act as a barrier between other users and the information in the home or root directory of the computer system.

While a program is being executed (during the lifetime of the execution), the program is commonly referred to as a "process." That is, as used herein, a process refers to an instance of a program that is being executed by the operating system. In Unix, for example, when an executable program is read into system memory, it becomes a process. Execution of a program a first time and then a second time represents two instantiations of a process, even though the processes may otherwise appear identical. Each process is typically assigned a unique identifier (ID) commonly referred to as a process ID.

A process may spawn other processes. The initiating process is commonly referred to as the "parent process" while the spawned processes are commonly referred to as "children processes." In general, most of the information associated with the parent process is passed to the children processes; the exceptions are known in the art. Each child process is assigned a unique process ID. Children processes are related to the parent process as well as to each other. The relationship between the parent and child processes is commonly termed a "process group."

A process may execute in user space 210 and kernel space 220. A process executing in user space 210 is commonly said to be running in user mode. A process in user mode can access kernel space 220 using a "system call." In general, a system call provides an entry point for a process executing in user space 210 to obtain services from kernel space 220. By making a system call, the process switches to execution in kernel space 220. A process executing in kernel space 220 is commonly said to be running in kernel mode.

As an overview, the present invention, in its various embodiments, introduces two new system calls: an encode system call, and a decode system call. The encode system call causes information (e.g., passwords, database entries, etc.) to be copied from user space 210 into kernel space 220. In one embodiment, the encode system call causes the information to be encrypted in the process of being copied into kernel space 220. The decode system call causes information to be copied from kernel space 220 into user space 210. In an embodiment in which the information in kernel space 220 has been encrypted according to the encode system call, the decode system call causes the information to be decrypted in the process of being copied into user space 210.

In Unix, the encode system call can be represented as "encode(2)" and the decode system call as "decode(2)," wherein "(2)" refers to the Unix man page; however, embodiments of the present invention are not limited to Unix applications. Various embodiments of the present invention are described further in conjunction with FIGS. 3A and 3B, below.

Figure 3A:
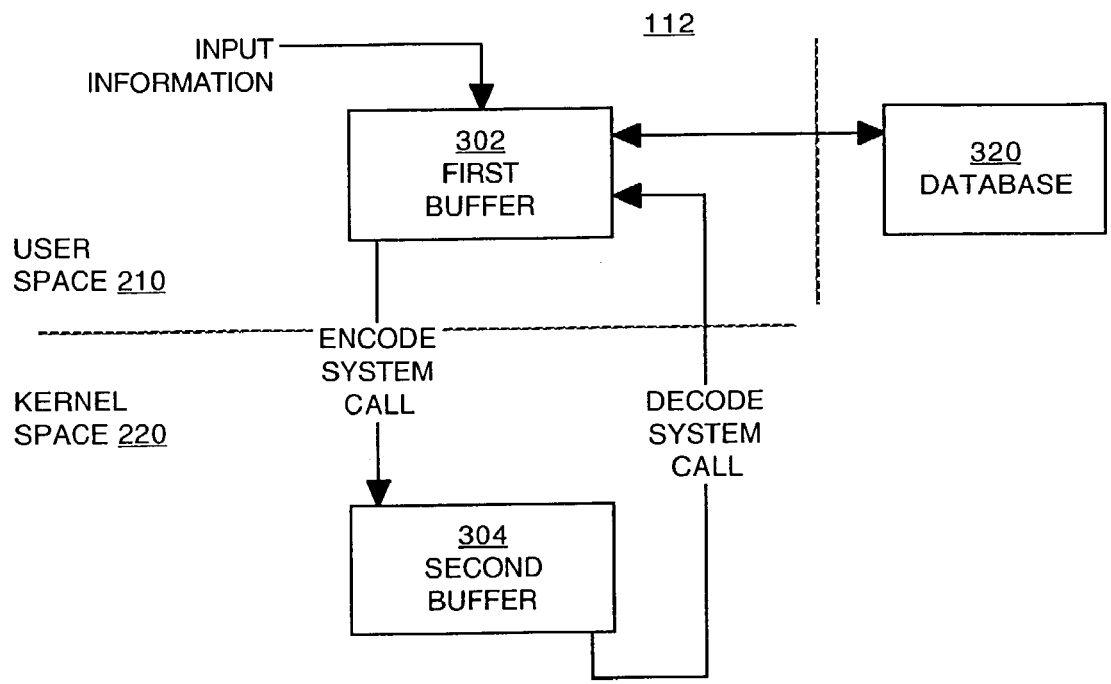
FIG. 3A illustrates the flow of data between user space and kernel space according to one embodiment of the present invention.

FIG. 3A illustrates the flow of data between user space 210 and kernel space 220 in a computer system 112 according to one embodiment of the present invention. For simplicity, an embodiment using a single set of buffers 302 and 304 is illustrated and described; however, as will be seen, multiple buffers may also be used. In addition, the embodiment of FIG. 3A is described for a single process; however, it is appreciated that multiple processes may be executing in parallel.

In the present embodiment, input information is received into first buffer 302. For example, the input information may be a password that is entered by a user. The input information may also be data received from database 320. Database 320 may reside on the computer system 112, or it may reside on another computer system that is in communication with computer system 112.

The information received into first buffer 302 may have already been conventionally encrypted in user space 210 using any of the various encryption routines known in the art. For example, the information in database 320 may be stored in encrypted form. However, in many cases, the information in database 320 is not stored in encrypted form, and is instead protected against unauthorized access by some other mechanism, typically a password. As will be seen, the features of the present invention can be implemented whether the information received into first buffer 302 has been conventionally encrypted or not. In the former case, the features of the present invention can be implemented as an alternative to the use of conventional encryption; in any case, the features of the present invention provide an additional level of security for sensitive information.

In the embodiment of FIG. 3A, an encode system call will copy or forward the information in first buffer 302 to second buffer 304 in kernel space 220. Once provided to second buffer 304, the information in first buffer 302 can be cleared (removed). In this manner, the information is removed from user space 210, from where it would be more readily accessible to unauthorized users, and is placed into kernel space 220, from where it is protected from access by unauthorized users.

In one embodiment, the information in kernel space 220 is encrypted using an encryption key. The information may be encrypted either in the process of being copied to kernel space 220 or after being copied to kernel space 220. In general, the information may be encrypted in response to an encode system call.

The information (encrypted or not) remains in second buffer 304 until it is needed by an executing program or process. When the information is needed, a decode system call will copy the information from second buffer 304 in user space 210 (e.g., to first buffer 302). In an embodiment in which the information has been encrypted in response to an encode system call, the information is decrypted either in the process of being copied to user space 210 or after being copied to user space 210. In general, if the information is encrypted, it may be decrypted in response to a decode system call. In one such embodiment, the information is decrypted using the same key used for encrypting the information. Asymmetric keys may also be used.

In one embodiment, the information is retained in kernel space 220 (e.g., in second buffer 304) for the lifetime of the associated process, and moved (copied) back to user space 210 (e.g., to first buffer 302) only when needed. When the process ends, the information is deleted from second buffer 304 (and from first buffer 302 as well). Significantly, the movement of information between user space 210 and kernel space 220, and the encryption and decryption of the information, are transparent to the user.

Thus, the amount of time in which sensitive information is exposed to unauthorized access is reduced. Consider the example of a password entered by a user. According to the embodiments of the present invention, in response to an encode system call, the password is moved to kernel space 220 at once (the password may be copied to kernel space 220 and cleared from user space 210.) The password may also be encrypted in the process of moving it to kernel space 220. As such, should there be a delay in authenticating the password against a name service database (or some other type of delay), the password is resident in kernel space 220, which provides a barrier to unauthorized access regardless of the length of the delay. Once the processing of the password can proceed without further delay, the password (decrypted if necessary) can be returned to user space 210. Note that the password can be conventionally encrypted in user space 210 at any point in the preceding description. That is, the password can be conventionally encrypted in user space 210 and then moved to kernel space 220 (perhaps encrypted a second time), or the password can be conventionally encrypted in user space 210 after it is returned (copied) from kernel space 220.

In one embodiment, each time an encode system call is executed, the information in second buffer 304 is overwritten with the information from first buffer 302. However, in other embodiments, multiple instances of information can be handled in parallel by adding an argument to the system calls and/or to the information and by using additional buffers in kernel space 220. By adding an argument to the system call and/or to the information itself, one instance of information can be distinguished from another, and the system calls can be properly directed to the information with which they are associated. The use of additional buffers allows each instance of information to be separately stored in parallel.

Similarly, the features of the present invention can be extended to multiple processes executing in parallel.

In one embodiment, encryption in kernel space 220 (in response to an encode system call) is performed using an encryption/decryption key that is maintained in kernel space 220. In one such embodiment, the encryption/decryption key would remain in kernel space 220 (that is, it is not exposed outside of kernel space 220).

In one embodiment, the encryption/decryption key is unique per process, so that the information encrypted by one process may not be decrypted by another process. In another embodiment, the encryption/decryption key (as well as the information in second buffer 304) is shared among children processes spawned by a parent process. In one more embodiment, the encryption/decryption key (and the information in second buffer 304) is propagated to other processes that are not necessarily children processes. For example, should a process end before the information in second buffer 304 is decrypted, the encryption/decryption key may be propagated to a subsequent process that can use the key to decrypt the encrypted information.

In various other embodiments, alternative forms of an encryption/decryption key may be used. In one embodiment, the key may be the same for all or some number of users, or it may be unique per user. In another embodiment, the key may be unique per system call; as mentioned above, the same key may be used for an encode system call and an associated decode system call, or the key may be asymmetric.

In addition, in various other embodiments, the encryption/decryption key can be made more unique by deriving the key from an attribute of the executing program, or from a combination of the program attributes. For example, a checksum, a time stamp, a mode of operation, or an item of "inode" information that is associated with the program, or a combination of these elements, can be used to derive an encryption/decryption key (inode information is a term of the art that refers to information about file size, file location, permissions, etc.). In such an embodiment, the encryption/decryption key would be calculated when the program runs and maintained within the process structure of the program. As such, the encryption/decryption key would remain unchanged each time the program ran, but would change when one of the attributes of the program changed.

Figure 3B:
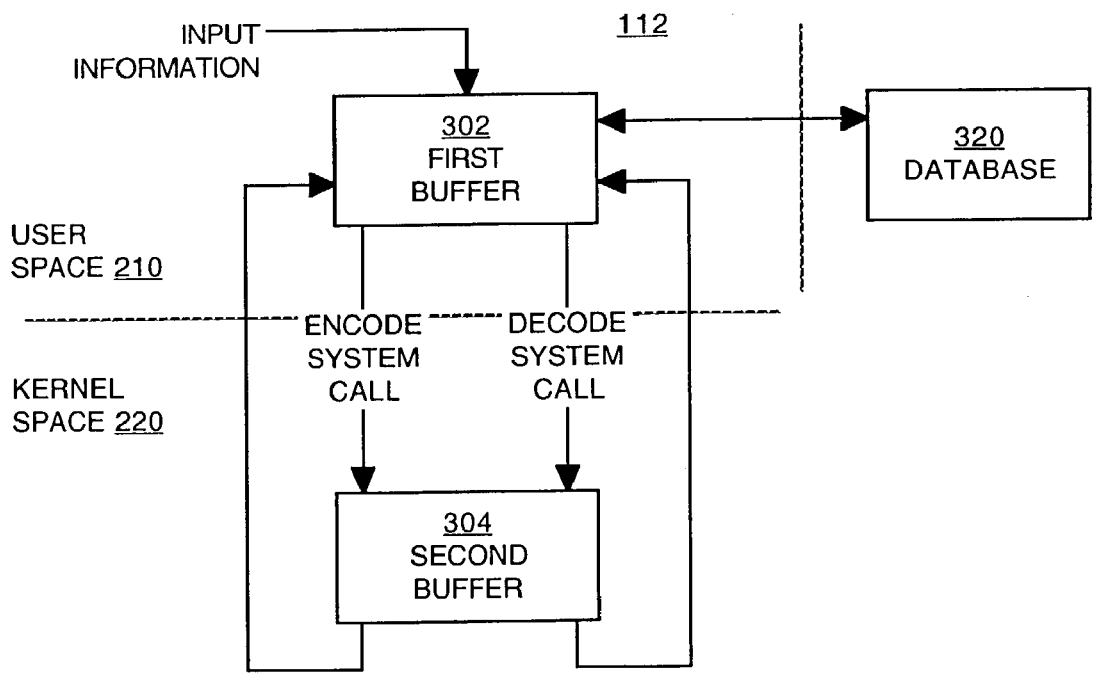
FIG. 3B illustrates the flow of data between user space and kernel space according to another embodiment of the present invention.

FIG. 3B illustrates the flow of data between user space 210 and kernel space 220 in a computer system 112 according to another embodiment of the present invention. A difference between the embodiment of FIG. 3B and the embodiments described in conjunction with FIG. 3A is that, after encryption in kernel space 220, the encrypted information is forwarded back to first buffer 302. Thus, in this embodiment, the information is stored in encrypted form in first buffer 302. When the information is subsequently needed by a program or process, the information is returned to kernel space 220 (e.g., second buffer 304) for decryption in response to a decode system call. The decrypted information is then returned to user space 210, where it can be used by the requesting process or program. Other features and embodiments of the present invention described above in conjunction with FIG. 3A may be similarly utilized by the embodiment of FIG. 3B.

Figure 4:
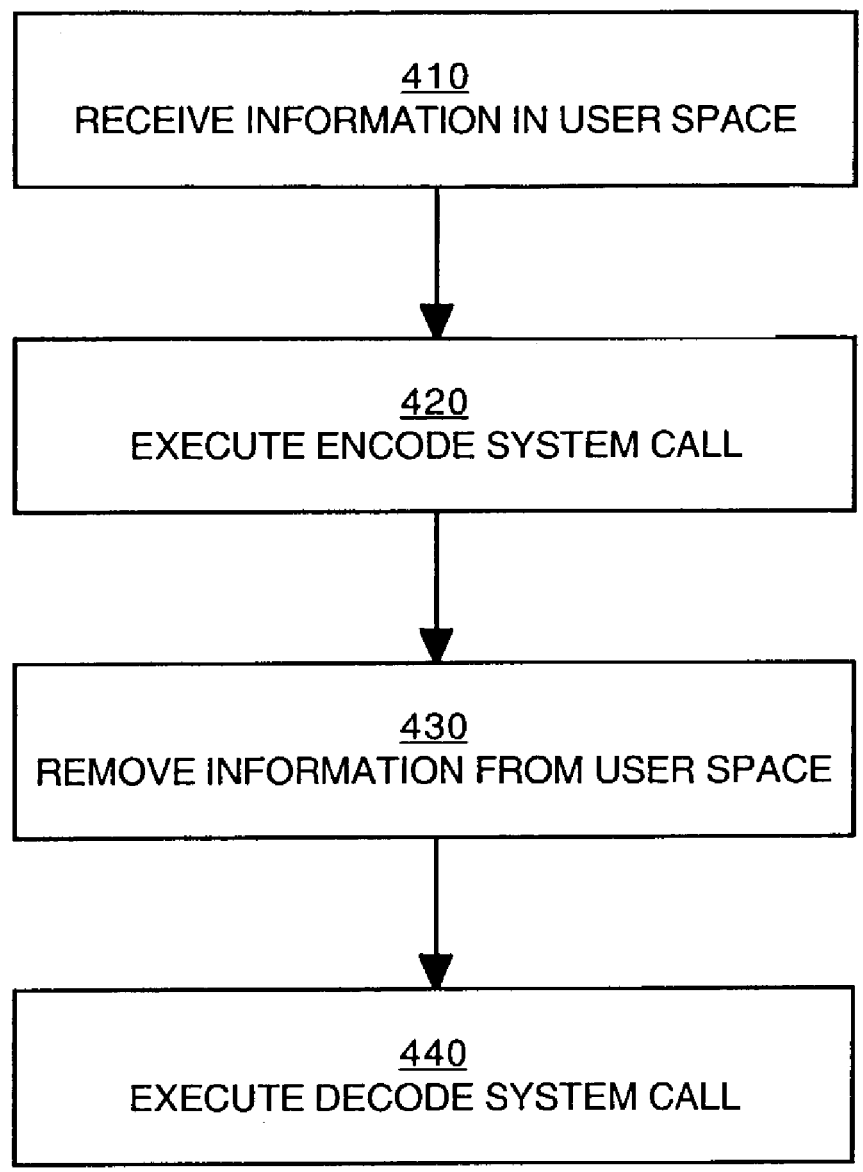
FIG. 4 is a flowchart of a process for providing security of information according to one embodiment of the present invention.

FIG. 4 is a flowchart 400 of a process for providing security of information according to one embodiment of the present invention. Although specific steps are disclosed in flowchart 400, such steps are exemplary. That is, embodiments of the present invention are well suited to performing various other steps or variations of the steps recited in flowchart 400. It is appreciated that the steps in flowchart 400 may be performed in an order different than presented, and that not all of the steps in flowchart 400 may be performed. In one embodiment, the method of flowchart 400 is implemented by a computer system such as computer system 112 of FIG. 1. In one such embodiment, the method of flowchart 400 is implemented as computer-readable instructions stored in memory of computer system 112 and executed by processor 101. In another such embodiment, the method of flowchart 400 is implemented using a computer-readable medium having computer-readable program code embodied therein, which is executed by computer system 112.

In step 410 of FIG. 4, in the present embodiment, information is received in user space. In one embodiment, the information is received into first buffer 302 of FIGS. 3A and 3B. The information may be entered by a user (e.g., a password or database entry), or the information may include database entries from a database (e.g., database 320 of FIGS. 3A and 3B). The information may or may not be conventionally encrypted.

In step 420 of FIG. 4, in the present embodiment, a system call is executed. The system call may be referred to as an encode system call. In response to this system call, the information is caused to be copied or moved from user space to kernel space. In one embodiment, the information is copied or moved to second buffer 304 of FIGS. 3A and 3B. The information in kernel space may or may not be encrypted in response to the encode system call.

In step 430 of FIG. 4, in the present embodiment, the unencrypted information is removed from user space when it is copied to kernel space. Thus, unencrypted information is not resident in user space for an extended period of time. Instead, the information is maintained in kernel space, which provides a barrier against unauthorized access. Note that, in an embodiment in which the information is encrypted in response to the encode system call, the encrypted information may also be stored in user space (e.g., in first buffer 302 of FIGS. 3A and 3B).

In step 440 of FIG. 4, in the present embodiment, another system call is executed. This system call may be referred to as a decode system call. In an embodiment in which encrypted information is stored in user space, in response to a decode system call, the encrypted information is provided to kernel space (e.g., second buffer 304 of FIGS. 3A and 3B), decrypted, and returned (copied) to user space. In an embodiment in which encrypted information is stored in kernel space, the encrypted information is decrypted in response to a decode system call and returned (copied) to user space (although not necessarily in that order). In an embodiment in which the information in kernel space is not encrypted, the information is returned (copied) to user space.

In summary, embodiments of the present invention provide systems and methods that can reduce the amount of time that information is accessible in unencrypted form. Information is protected within a process for the duration of the process, thereby reducing the time during which the information is exposed to unauthorized access.

Embodiments of the present invention, methods for improved security of software applications, have been described. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and it's practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for providing security of information in a computer system, said method comprising:
   receiving data to be made secure, said data received in user space, the user space defined by an operating system;
   executing an encode system call for encoding the data, said encode system call configured to:
   a) move the data from the user space into a kernel space and maintain the data in the kernel space, the kernel space defined by said operating system;
   b) encrypt the data using an encryption key maintained at the kernel space for a process, such that the encrypted data is in a form that is usable by the process executing in the kernel space, wherein the encrypted data is maintained in the kernel space for the duration of the process requesting the data;
   c) clear said user space of said data upon moving the data to the kernel space; and
   d) copy said encrypted data from said kernel space to said user space;
   executing a decode system call for decoding the data, the decode system call configured to:
   e) decrypt the data using a decryption key maintained at the kernel space for the process upon a request for the data; and
   f) move the decrypted data from kernel space to user space, the encrypted data remaining in the kernel space until processing of the decrypted data ends and is then removed from kernel space.

2. The method of claim 1, wherein said data are previously encrypted in said user space, wherein said encode system call causes said data to be encrypted a second time.

3. The method of claim 1, wherein said encryption key is unique per process, unique per user, shared by processes, shared by users, or unique per system call.

4. The method of claim 1 wherein said encryption key is derived from attributes of a program that executes the process.

5. The method for providing security of information in a computer system of claim 4, wherein the encryption key changes with the changes to any one or more of the process attributes of the program executing the process.

6. The method of claim 1 wherein said data and said encryption key are inherited by children processes of the process.

7. The method for providing security of information in a computer system of claim 1, wherein the encryption key and the decryption key are asymmetric.

8. A computer system comprising:
   a memory unit; and
   a processor coupled to said memory unit, said processor executing a method for providing security of information resident on said computer system, said method including,
   receiving data to be made secure, said data received in user space, the user space defined by an operating system executing on said computer system;
   executing an encode system call for encoding the data, said encode system call configured to:
   a) copy said data from said user space to kernel space and maintain the data in the kernel space, the kernel space defined by said operating system;
   b) encrypt the data using an encryption key maintained at the kernel space for a process, such that the encrypted data is in a form that is usable by the process executing in the kernel space, wherein the encrypted data is maintained in the kernel space for the duration of the process requesting the data;
   c) remove said data from said user space upon copying of the data to the kernel space; and
   d) copy said encrypted data from said kernel space to said user space;
   executing a decode system call for decoding the data, the decode system call decrypting the data using a decryption key maintained at the kernel space for the process upon a request for the data and moving the data from the kernel space to user space, wherein the encrypted data remains in the kernel space until processing of the decrypted data ends and is then removed from the kernel space.

9. The computer system of claim 8, wherein said data are previously encrypted in said user space, wherein said encode system call causes said data to be encrypted a second time.

10. The computer system of claim 8, wherein said encryption key is unique per process, unique per user, shared by processes, shared by users, or unique per system call.

11. The computer system of claim 8, wherein said encryption key is derived from attributes of a program that executes the process.

12. The computer system of claim 8, wherein said data and said encryption key are inherited by children processes of the process.

13. The method for providing security of information in a computer system of claim 8, wherein decryption of data using a decryption key performed before, during or after moving the data from the kernel space to user space.

14. The method for providing security of information in a computer system of claim 8, wherein encryption of data using an encryption key performed before, during or after copying the data from the user space to the kernel space.

15. A computer-usable medium having computer-readable program code embodied therein for causing a computer system to perform a method for providing security of information in a computer system, said method comprising:
   receiving said information in user space, the user space defined by an operating system;
   executing an encode system call for encoding said information, said encode system call configured to:
   a) move the information from the user space into a kernel space and maintain the information in kernel space, the kernel space defined by said operating system;
   b) encrypt the information using an encryption key maintained at the kernel space for a process, such that the encrypted information is in a form that is usable by the process executing in the kernel space, wherein the encrypted information is maintained in the kernel space for the duration of the process requesting the information;
   c) clear said user space of said information upon moving the information to the kernel space; and
   d) copy said encrypted information from said kernel space to said user space;
   executing a decode system call for decoding the data, the decode system call configured to:

e) decrypt the data using a decryption key maintained at the kernel space for the process upon a request for the data; and f) move the decrypted data from kernel space to user space, the encrypted data remaining in the kernel space until processing of the decrypted data ends and is then removed from the kernel space.

16. The computer-usable medium of claim 15, wherein said information is already encrypted in said user space, wherein said encode system call causes said information to be encrypted a second time in said kernel space.

17. The computer-usable medium of claim 15, wherein said encryption key is unique per process, unique per user, shared by processes, shared by users, or unique per system call.

18. The computer-usable medium of claim 15, wherein said encryption key is derived from attributes of a program that executes the process.

19. The method for providing security of information in a computer system of claim 18, wherein the encryption key changes with the changes to any one or more of the process attributes of the program executing the process.

20. The computer-usable medium of claim 15, wherein said information and said encryption key are inherited by children processes of the process.

21. The method for providing security of information in a computer system of claim 15, wherein the encryption key and the decryption key are asymmetnc.

\* \* \* \* \*